United States Patent [19]
Braun

[11] 3,918,864
[45] Nov. 11, 1975

[54] MOLDING OF SYNTHETIC PLASTIC MEMBERS ONTO A TRAVELLING ELONGATED ELEMENT

[75] Inventor: Dieter Braun, Koln, Germany

[73] Assignee: Felren & Guilleaume Kabelwerke Aktiengesellschaft, Koln-Mulheim, Germany

[22] Filed: Apr. 9, 1974

[21] Appl. No.: 459,354

Related U.S. Application Data

[62] Division of Ser. No. 334,952, Feb. 22, 1973.

[30] Foreign Application Priority Data

Feb. 23, 1972 Germany.................. 2208545

[52] U.S. Cl............. 425/129 R; 425/122; 425/246; 425/245
[51] Int. Cl.² ........................................ B29F 1/10
[58] Field of Search......... 425/122, 814, 246, 129 R, 425/247, 451; 264/251; 164/328, 129

[56] References Cited
UNITED STATES PATENTS

| | | | |
|---|---|---|---|
| 2,282,308 | 5/1942 | Dahlin | 425/814 X |
| 3,310,834 | 3/1967 | Simpson et al. | 425/451 X |
| 3,345,687 | 10/1967 | Marx | 425/246 |
| 3,574,894 | 4/1971 | Aoki | 425/243 X |
| 3,635,612 | 1/1972 | Fortin et al. | 425/247 X |

FOREIGN PATENTS OR APPLICATIONS

| | | | |
|---|---|---|---|
| 1,006,605 | 4/1952 | France | 264/251 |
| 45-30,589 | 10/1970 | Japan | 425/246 |

*Primary Examiner*—Francis S. Husar
*Assistant Examiner*—David S. Safran
*Attorney, Agent, or Firm*—Michael S. Striker

[57] ABSTRACT

A mold is closed about an elongated element at a receiving location, and synthetic plastic material is introduced into the mold to injection-mold a synthetic plastic member about the element within the mold. The mold with the elongated element is advanced in a circular path until the material of the synthetic plastic member has hardened, and thereupon the mold is opened at a discharging location. Both an apparatus and a method are disclosed.

6 Claims, 5 Drawing Figures

MOLDING OF SYNTHETIC PLASTIC MEMBERS ONTO A TRAVELLING ELONGATED ELEMENT

This is a division of application Ser. No. 334,952 filed Feb. 22, 1973.

BACKGROUND OF THE INVENTION

The present invention relates to the molding of synthetic plastic members onto a travelling elongated element, and more particularly to the molding of synthetic plastic spacer disks serving for insulating purposes about the center conductor of high-frequency coaxial cables. Still more particularly the invention relates to a method of effecting such molding and to an apparatus for carrying out the method.

It is known to provide the center conductor of high-frequency coaxial cable with synthetic plastic spacer disks which serve to maintain it out of contact and insulate it from the outer conductor which surrounds the inner conductor. Evidently, it is possible to provide these plastic disks with a center opening and to push them longitudinally onto the inner conductor. However, in view of the fact that such conductors are produced in lengths which may amount to miles, this is hardly practical. It is therefore known from the art to injection-mold the synthetic plastic members directly onto the center conductor. According to a prior-art proposal two continuously moving endless chains are provided which are driven at identical speed and which each carry one half of a two-section mold. Of course, more than a single mold may be provided, and each mold will have one half secured to one chain and its other half secured to the other chain. Along a certain portion of their travel the chains move in such a manner that the two sections of a mold move together. The center conductor of a coaxial cable is so advanced that it passes through these mold sections and is engaged thereby when they move together, so that they advance it with them as they in turn are advanced by the travelling chains. The now closed mold passes the injection nozzle of a stationary injection molding machine which injects synthetic plastic material into the travelling mold, and after the material has solidified in the mold to form a synthetic plastic spacer disk, the mold is again opened as the chains move apart.

The problem with this prior-art approach is that great precision is required in the movement of the components and in the advancement of the chains, as well as a substantial effort to prevent vibrations from taking place in the chains and the mold sections because otherwise the latter will not properly mate as they come together. Moreover, the inlet of each mold must always be precisely aligned with the outlet nozzle of the extruder, and the cross-section of this outlet nozzle is only approximately one square millimeter in area. Evidently, this causes problems. In addition, in the time between the registration of a first and a subsequent mold section with the injection nozzle, the chain links close the opening of the injection nozzle whereas the pressure in the nozzle continues unabated. Depending upon the viscosity and adhesion of the plastified synthetic plastic material this frequently results in plastified material being carried along on the surfaces of the chain links which are juxtaposed with and intended to close the outlet nozzle of the extruder. When this material has hardened, then the sealing effectiveness between the side faces of the chain links and the outlet of the nozzle becomes increasingly ineffective, so that there is danger of complete malfunction of the apparatus.

SUMMARY OF THE INVENTION

Accordingly, it is the general object of the present invention to overcome the disadvantages of the prior art.

More particularly it is an object of the present invention to provide an improved method for molding synthetic plastic members onto a travelling elongated element, particularly for molding synthetic plastic spacer disks onto the inner of central conductor of a high-frequency coaxial cable.

Another object of the invention is to provide an improved apparatus for carrying out the method.

In keeping with these objects, and others which will become apparent hereafter, one feature of the invention resides in a method of molding synthetic plastic members onto a travelling elongated element, which method comprises the steps of closing a mold about an elongated element at a receiving station, and injection-molding a synthetic plastic member about the elongated element within the mold. The mold is advanced with the elongated element in a circular path until the material of the synthetic plastic member has hardened, and thereupon the mold is opened at a discharging location.

With this approach to the solution of the problem at hand, a high production speed can be obtained, an absolute minimum possibility for malfunction occurs, and a proper configuration of the molded members is assured despite high-speed production.

Evidently, the more quickly the synthetic plastic material of the injection-molded member can harden, the more rapidly the mold in which the member has been formed will be available for the next forming operation. It is therefore desirable that the hardening be carried out as quickly as possible whereby the operating speed and the production can be significantly improved.

Briefly stated, the apparatus according to the present invention comprises mold means arranged for travel in a circular path, closing means for closing said mold means about an elongated element at a first location, so as to take the same along in said circular path, and admitting means for admitting hardenable synthetic plastic material into said mold means to form therein a synthetic plastic member about the elongated element. Opening means is provided for opening the mold means from about the element and the member at a second location which is circumferentially spaced in this path from the first location.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing. BRIEF DESCRIPTION OF THE DRAWING FIG. 1 is a diagrammatic top-plan view of an apparatus according to the present invention;

DESCRIPTION OF THE PREFERRED EMBODIMENTS

Figure 1:
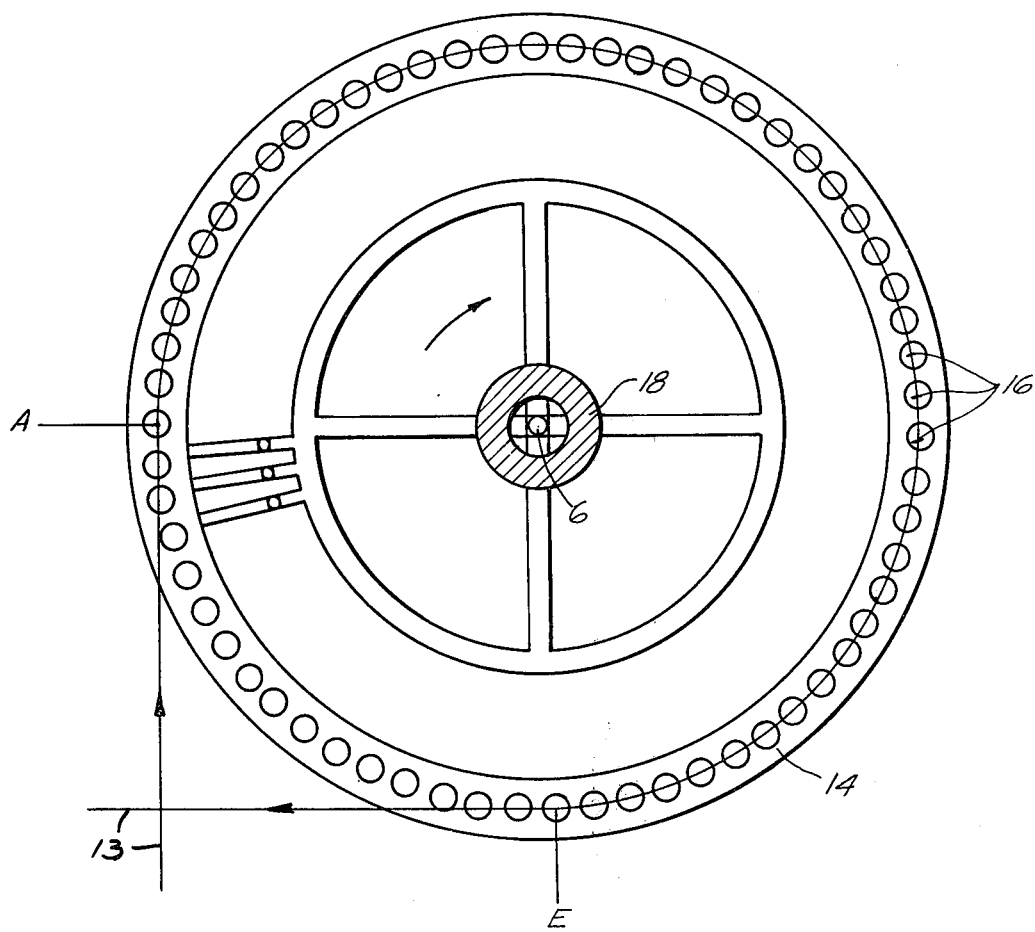

Discussing the apparatus which has been illustrated in an exemplary embodiment in FIGS. 1–5, it will be seen that reference numeral 14 identifies a turntable which may, for instance, have a diameter of 600 mm. Mounted about the circumferential margin of the truntable 14 is a train of plurality of molds 16, in the illustrated embodiment sixty-four of them. They are arranged in parallelism with the axis of rotation of the turntable 14 and are located in one and the same plane. If adjustments in their height are necessary, the molds 16 can be mounted shiftably.

Reference numeral 13 identifies a travelling elongated element, such as the center element of a highfrequency coaxial cable which is to be provided with synthetic plastic members molded onto it. It will be seen that, as indicated by the arrow in FIG. 1, the conductor 13 enters tangentially into the circular path which is described by the molds 16 during rotation of the turntable 14, which latter is mounted for rotation about the hollow shaft 18. The conductor 13 is engaged at the engaging location A by a mold and advances with the same in a circular path until the same mold releases it at the releasing location E which is circumferentially spaced from the location A, as shown in FIG. 1. Injection of synthetic plastic material takes place beginning at the location A once the mold has been closed, and during travel to the location E the injected synthetic plastic material has time to harden. This means that the molds are closed between the locations A and E during travel in clockwise direction, and during the same travel they are open while passing from the location E to the location A. Thus, at any moment of time forty-eight closed molds will be travelling from the location A to the location E, assuming that the apparatus has sixty-four molds 16 as shown in FIG. 1. If it is assumed that the time required for a mold to pass from location A to location E is for instance three seconds, and given the provision of sixty-four of the molds 16, then the conductor 13 can advance at a speed of twenty-four meters per minute while being provided with the synthetic plastic spacer disks.

Figure 2:
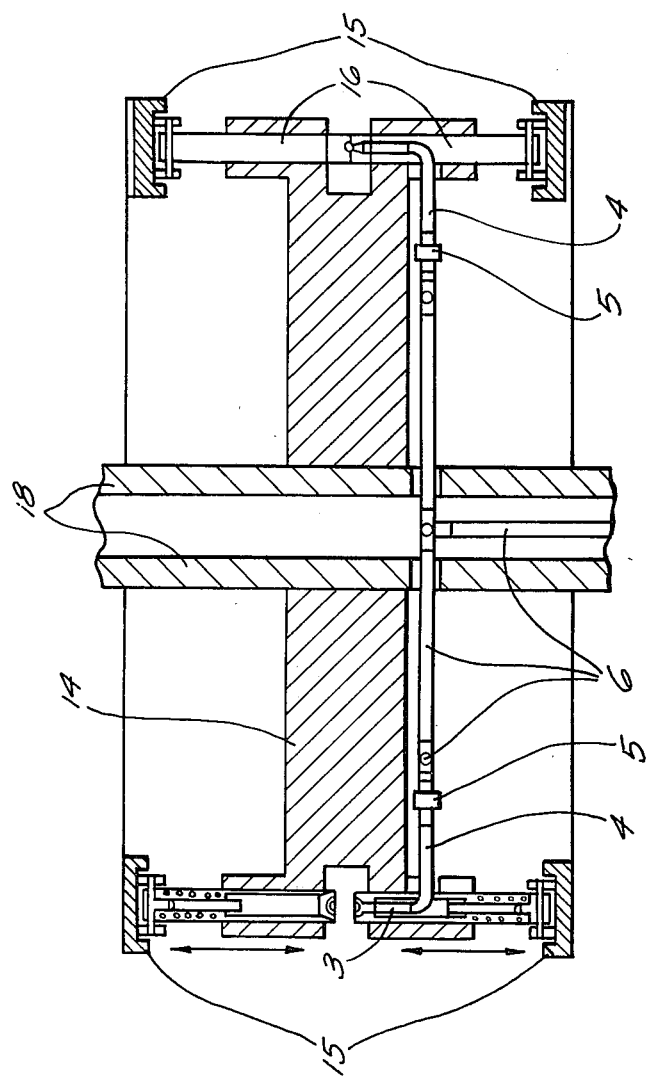
FIG. 2 is an axial section through the apparatus of FIG. 1.

Details of the apparatus are shown in FIGS. 2–5. In FIG. 2 two of the molds 16 will be seen, as well as a pipe 6 which leads to a non-illustrated source of synthetic plastic material in plastified state, and a system of metallic conduits 3, 4 communicating with the pipe 6 and extending to each of the molds 16. The pipe 3 in each case is rigid and communicates with a flexible hose-like metallic conduit 4 which connects it with the pipe 6 and which is resistant to pressure as indeed the conduit or pipe 3. In the illustrated embodiment each of the molds is also provided with a valve 5 interposed between the pipe 6 and the respective conduit 4.

In FIG. 2 I have illustrated a condition in which the left-hand visible mold 16 is opened, that is its two mold sections are retracted from one another, whereas the right-hand mold 16 is closed. The mounting of the molds on the turntable 14 assures that no vibrations are transmitted to them, so that no difficulties can occur in terms of improperly closed molds. This is further enhanced by the fact that each mold 16 forms a completely separate unit which is separate from all other molds 16, due to the fact that it has its own system of supply conduits 3, 4 and the associated valve 5.

It will be appreciated that an increase in production speed can be attained by using a larger-diameter turntable 14, providing it with more of the molds 16 and increasing its speed of rotation, which improves the output per unit of time while still assuring that sufficient time remains for the synthetic plastic material injected into a particular mold, to harden before the mold is opened again.

Figure 3:
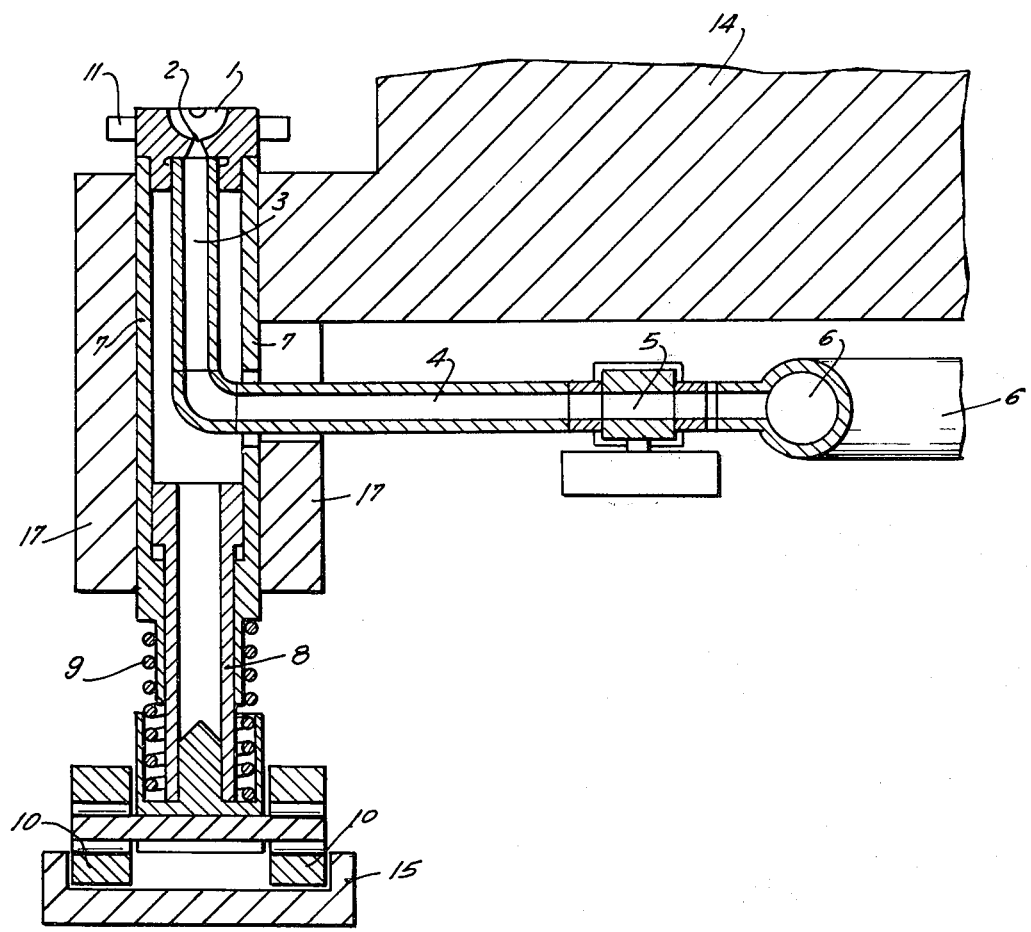
FIG. 3 is an axial section, on an enlarged scale, through the left-hand portion of FIG. 2, with parts omitted for clarity.

It will be seen in FIG. 3 that the lower section of each mold 1 (the upper section has been omitted but should be understood to be mirror-symmetrical) can be cooled by means of one or more tubes or conduits passing through it and capable of supplying a cooling fluid. Each mold section of a mold 16 is identified in FIGS. 3 and 4 with reference numeral 1 and is mounted on a guide tube 7 which has freedom of axial shifting in the portions 17 which extend from the outer periphery of the turntable 14. However, the tubes 7 must not have any freedom of movement other than axial displacement. The molds are closed or opened simply by advancing the guide tubes 7 carrying the mold sections 1 towards and away from one another. The necessary force for such advancement in closing direction is transmitted by a pressure ram 8 via a pressure spring 9. The free end of each of the rams 8 carries a pair of rollers 10 which is engaged by an annular rail 15 which extends about the periphery of the turntable 14, below the latter as far as the lower mold sections are concerned (FIG. 3), and above it as far as the upper mold sections are concerned (FIG. 2). It is the rails 15 which supply sufficient pressure via the rams to cause the mold sections to close. The times or the angular positions of the turntable 14 at which the mold sections are to be opened or closed, are pre-programmed by different heights in the surfaces of the rails on which the rollers 10 contact. In other words, the rails or at least their contact surfaces facing the rollers 10, are essentially of wavy configuration, so that the rollers roll along the rails and are alternately raised together with the ram 8 and permitted to become lowered due to the counterforce of the spring 9. Until the mold sections 1 of the mold 16 contact one another, the springs 9 act as relatively rigid members, and only by the further upward or downward (depending upon which of the mold sections is involved) depression of the rams 8 will the springs yield and will in dependence upon their compression serve the necessary purpose of applying force for holding the molds closed. In the illustrated embodiment, where it is assumed that the disks to be formed have a diameter of 10 mm and a thickness of 2 mm, the surface which is determinative of the force required for maintaining the mold sections 1 in closed position will have a dimension of only 0.2 cm$^2$. This means that if the synthetic plastic material is injected at a pressure of 200 kg/cm$^2$, this amounts to a pressure of 40 kg, a force which can be transmitted with the arrangement just described without any difficulties.

Because the mold sections are very solidly mounted with the construction according to the present invention, there is never any difficulty about proper closing of the mold sections which will always engage one another without any possibility of leakage of the material. In the first place, the mold sections will open only sufficiently to permit insertion and removal of the conductor 13 and the disks which have been molded onto it.

Of course it is possible to provide a separate mechanism for opening and closing the molds, either electromagnetically operated, hydraulically operated, or pneumatically operated. In any case, with the construction according to the present invention a further advantage is obtained in that no separate means need be provided for engaging and transporting the conductor 13 which will be sufficiently firmly held by the closed mold sections to be taken along by the same.

Figure 4:
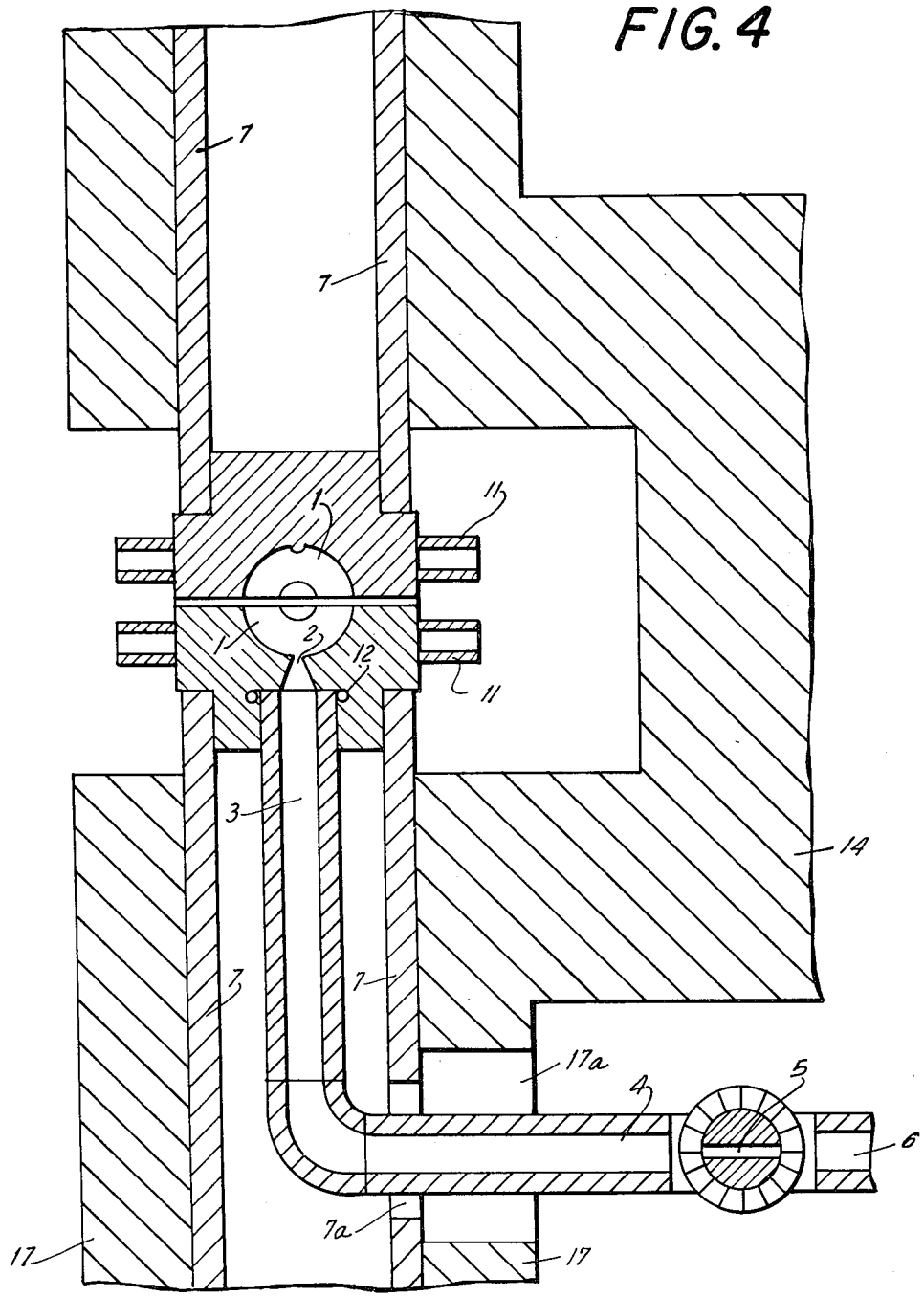
FIG. 4 is another enlarged fragmentary section, showing in detail the operation of the apparatus when one of the molds is closed.

It will be seen in FIG. 4 that the lower mold section of each mold 16 is provided with an inlet 2 — which may for example have a diameter of 0.2 mm and a length of 1 mm—communicating with a rigid supply conduit 3 which in turn communicates with a flexible metallic pressure hose 4. The hose 4 extends laterally through an opening 7a in the guide tube 7, and an opening 17a on the portion 17 of the turntable 14. The flexibility of the hose assures that the hose can yield as the mold sections open and close. The hose 4 is connected with the valve 5 which is interposed between it and the supply pipe 6. The valve 5 may be electrically or mechanically operated and permits or interrupts the flow of synthetic plastic material through the conduits 3 and 4 at the appropriate times. When the valve 5 is closed and the mold 16 is opened, the force of gravity and capillary depression prevent undesired outflow of liquid synthetic plastic material through the inlet tube into the mold.

It is particularly important that the temperature of the inlet 2 and the mold sections 1, especially the lower 1 of these, be appropriately regulated. It is therefore advantageous if both of the mold sections 1, and certainly the lower one, is provided with a heating coil 12 surrounding the inlet 2 and independent of the heating system (not shown) of the conduits 3, 4 and 6. Additionally, the molds are water-cooled by means of the conduits 11, as already pointed out, so that the temperature of the mold sections can be so regulated that the synthetic plastic material will become hardened in the mold and in the inlet channel 2 itself, but will remain liquid at the inlet opening to the channel 2. The flashing will tear loose when the mold is opened, at the inlet to the inlet channel 2, so that the latter is free for injection of the next quantity of synthetic plastic material.

With this construction, and due to the fact that the mold 16 with its mold sections 1, the inlet channel 2 and the conduit 3 form a unit, and the supply of plastified synthetic plastic material is automatically regulated by means of the valve 5, the undesired outflow of the mass of plastic material can be prevented and negative influences due to a lack of precision and due to vibrations can be avoided during the molding process.

Figure 5:
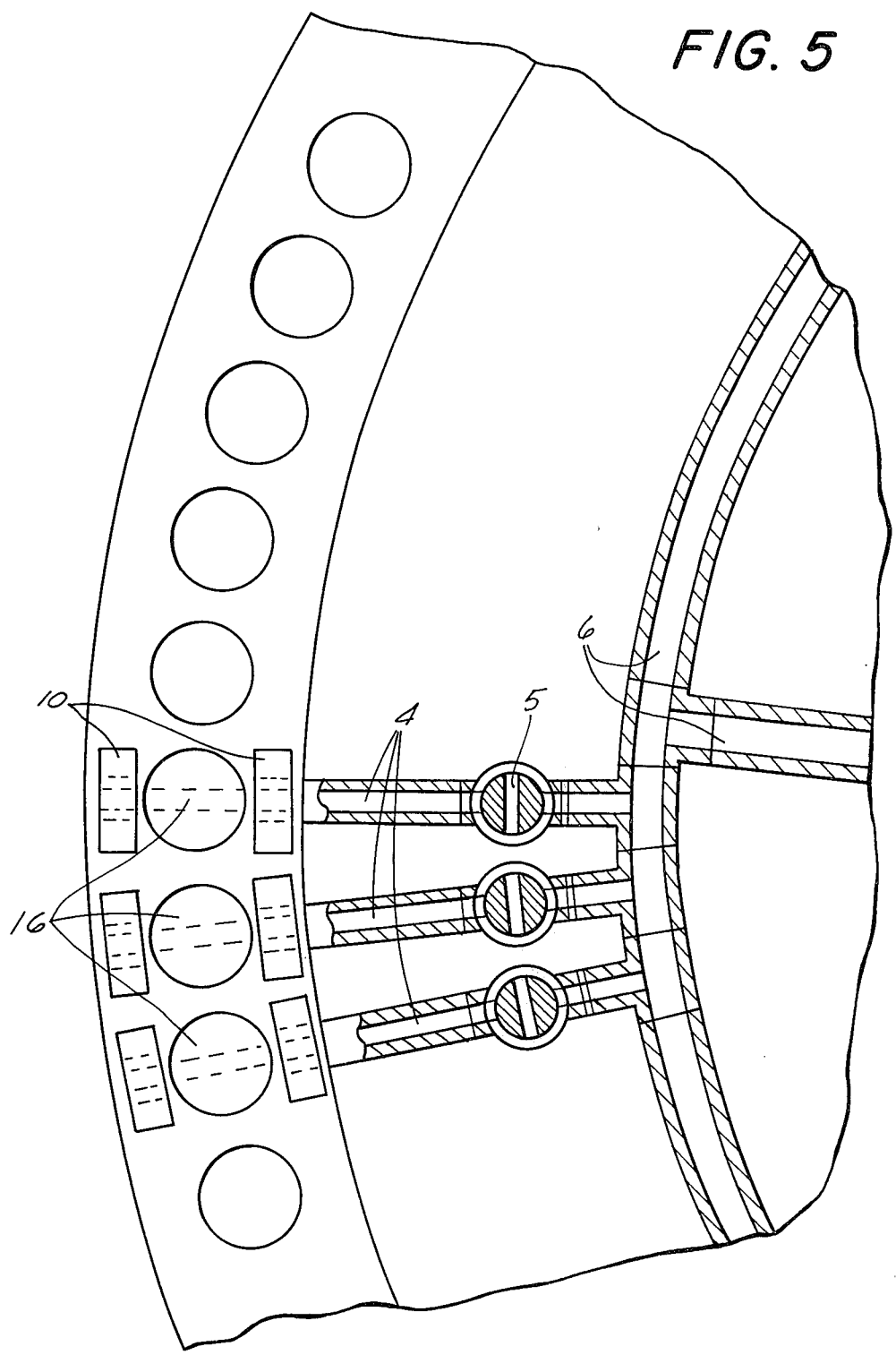
FIG. 5 is a partly sectioned enlarged fragmentary view showing a detail of the arrangement for supplying synthetic plastic material to the molds of the apparatus.

A fragmentary enlarged sectional detail view of the supply of synthetic plastic material is shown in FIG. 5. It will be seen that the molds 16 with the associated pairs of rollers 10 are shown somewhat diagrammatically, and that only some of them are illustrated. It is advantageous that each mold be provided with the individual conduits 3, 4 and the valve 5, as already discussed above. However, in order to reduce the flow resistance of the plastified material, and to reduce the space requirements, it is also advantageous if the supply of material is made in groups to the valve 5 and from there to the individual conduits 3, 4. This is illustrated in FIG. 5, and it will also be seen that the pipe 6 extends through the shaft 18 of the turntable 14 (for this, see FIGS. 1 and 2) where it can be connected with the extruder or other source of supply (of which the pipe 6 may be considered to be a part) via a non-illustrated rotary connector. Conduits supplying cooling water to the pipes 11 of the mold sections 1 can also be passed out through the shaft 18 and be connected with a source of supply via a further rotary connector (not shown).

It will be understood that each of the elements described above, or two or more together, may also find a useful application in other types of constructions differing from the types described above.

While the invention has been illustrated and described as embodied in the molding of synthetic plastic spacer disks onto a center conductor of a high-frequency coaxial cable, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for molding synthetic plastic members onto a travelling elongated element, comprising mold means including a train of individual molds each having two mold sections; means mounting said molds for travel in a circular path so that said mold sections of each mold travel concurrently along a common plane at opposite sides thereof; means for displacing said mold sections relative to one another substantially normal to said common plane between retracted positions in which said mold sections are disengaged from, and extended positions in which said mold sections engage, the elongated element and define a molding cavity about a portion of the same, said displacing means including rail means situated along said circular path spaced from said common plane and having surfaces at varying distances from the latter, and follower means connected with the respective mold sections and operative for following said surfaces and for displacing said mold sections in dependence on the instantaneous distance of said surfaces from said common plane, said displacing means comprising a first and a second guide tube for the respective mold sections, said rail means comprising an upper and a lower pressure rail, and said follower means comprising a first and a second ram each for one of said mold sections, a first and a second pressure spring each acting upon one of said rams and guide tubes, and two pairs of rollers each engaging one of said rams and one of said pressure rails; and means for introducing hardenable synthetic plastic material into the respective molding cavity to harden therein and to form the member about said portion of the elongated element when said mold sections of a given mold define said molding cavity, and including a source of said material located centrally of said circular path, a plurality of conduits each communicating said source with one of said molding cavities, and means for controlling the passage of said material through the respective conduits and including valve means in each of said conduits.

2. Apparatus as defined in claim 1; further comprising a circular turntable having a circumferential marginal portion; and wherein said molds are mounted on said circumferential marginal portion circumferentially spaced about said turntable.

3. Apparatus as defined in claim 2, each of said molds comprising cooling tubes for each of said mold sections, as inlet in said lower mold section for synthetic plastic material, and a heating coil surrounding said inlet.

4. Apparatus as defined in claim 3; each of said ducts comprising a rigid metallic conduit connected with said inlet, a flexible metallic conduit connected with said source and said rigid metallic conduit, and a valve interposed in said ducts and operative for admitting synthetic plastic material into said mold during each molding operation.

5. Apparatus as defined in claim 4, said turntable having a hollow central shaft about which it rotates; said source comprising a pipe extending through said hollow shaft; and further comprising a cooling conduit also extending through said hollow shaft and connected with the respective molds.

6. Apparatus for molding synthetic plastic members onto a travelling elongated element, comprising mold means arranged for travel in a circular path and including a train of individual molds all arranged in a common plane which includes said path, each of said molds having an upper and a lower mold section; closing means for closing said mold means about an elongated element at a first location, so as to take the same along in said circular path, and including an upper and a lower guide tube for the respective mold sections, an upper and a lower ram each for one of said mold sections, an upper and a lower pressure spring each acting upon one of said rams and guide tubes, an upper and a lower pressure rail, and two pairs of rollers each engaging one of said rams and one of said pressure rails; admitting means for admitting hardenable synthetic plastic material into said mold means to form therein a synthetic plastic member about said elongated element and including a source of synthetic plastic material, individual supply ducts connecting said mold with said source, and valve means in each of said supply ducts; and opening means for opening said mold means from about said element and member at a second location circumferentially spaced in said path from said first location.

* * * * *